(12) United States Patent
Solinas

(10) Patent No.: US 7,024,559 B1
(45) Date of Patent: Apr. 4, 2006

(54) METHOD OF ELLIPTIC CURVE DIGITAL SIGNATURE USING EXPANSION IN JOINT SPARSE FORM

(75) Inventor: Jerome A. Solinas, Westminster, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 840 days.

(21) Appl. No.: 10/185,843

(22) Filed: Jun. 28, 2002

(51) Int. Cl.
*G06F 11/30* (2006.01)

(52) U.S. Cl. .................. 713/180; 713/182; 713/200; 713/201

(58) Field of Classification Search ................ 713/180, 713/182, 200, 201
See application file for complete search history.

(56) References Cited

U.S. PATENT DOCUMENTS

| | | | |
|---|---|---|---|
| 4,200,770 | A | 4/1980 | Hellman et al. |
| 4,405,829 | A | 9/1983 | Rivest et al. |
| 4,995,082 | A | 2/1991 | Schnorr |
| 5,231,668 | A | 7/1993 | Kravitz |
| 5,497,423 | A | 3/1996 | Miyaji |
| 5,581,616 | A | 12/1996 | Crandall |
| 5,600,725 | A | 2/1997 | Rueppel et al. |
| 5,604,805 | A | 2/1997 | Brands |
| 5,606,617 | A | 2/1997 | Brands |
| 5,761,305 | A | 6/1998 | Vanstone et al. |

OTHER PUBLICATIONS

Francois Morain and Jorge Olivos "Speeding up the Computations on an Elliptic Curve Using Addition-Subtraction Chains," published in Theoretical Informatics and Applications, vol. 24, No. 6 1990, pp. 531-544.

Taher Elgamal "A Public Key Cryptosystem and a Signature Scheme Based on Discrete Logarithms," IEEE Transcations on Information Theory, vol. IT-31, No. 4, Jul. 1985.

*Primary Examiner*—Thomas R. Peeso
(74) *Attorney, Agent, or Firm*—Robert D. Morelli

(57) ABSTRACT

A method of generating and verifying a cryptographic digital signature using joint sparse expansion by a signer first selecting a field, an elliptic curve over the field, a point P of order q on the elliptic curve, w, k. Next, generating W=wP and K=kP. Next, transforming K to K*. Next, combining K*, W, and a message M to produce h. Next, combining K*, W, and M to produce c. Next, generating, s by either s=hw+ck (mod q), s=(hw+c)/k (mod q), or s=(hk+c)/w (mod q). Next, forming the digital signature as (K*,s). Next, a verifier acquires the field, the elliptic curve, P, W, M, and (K*,s). Next, computing h and c. Next, selecting $(n_0, n_1)$ as either $(sc^{-1} \pmod q), -hc^{-1} \pmod q))$, $(cs^{-1} \pmod q), hs^{-1} \pmod q))$ or $(-ch^{-1} \pmod q), sh^{-1} \pmod q))$. Next, generating binary expansions of $n_0$ and $n_1$ in joint sparse form. Next, computing, $Q=n_0 P + n_1 W$ via twin multiplication and a double-add-subtract method with the binary expansions in joint sparse form. Next, transforming, Q to Q*. Lastly, verifying, the digital signature if Q*=K*.

12 Claims, 4 Drawing Sheets

METHOD OF ELLIPTIC CURVE DIGITAL SIGNATURE USING EXPANSION IN JOINT SPARSE FORM

FIELD OF THE INVENTION

This invention relates to cryptography and, more particularly, to the generation and verification of a discrete logarithm based digital signature on an elliptic curve using expansion in joint sparse form.

BACKGROUND OF THE INVENTION

The field of cryptography has spawned numerous devices and methods such as scramblers, symmetric-key encryptors, and public-key encryptors.

A scrambler is a device that receives an unencrypted message (i.e., plaintext) and produces an encrypted message (i.e., ciphertext). The encryption function of a scrambler is fixed in hardware and does not change from message to message. One of the problems with a scrambler is that the same plaintext will produce the same ciphertext. An adversary may collect ciphertext messages from a particular scrambler and compare them against each other in order to analyze a particular ciphertext message. To overcome this problem, the users may change the function of the scrambler periodically. Such a solution is time consuming and expensive.

Another solution to the problem associated with a scrambler is symmetric-key encryption. A symmetric-key encryptor has two inputs (i.e., plaintext and a cryptographic key). A cryptographic key is a message, or number, that should appear random to an adversary. A symmetric-key encryptor combines the cryptographic key with the plaintext using a scrambling function in order to generate ciphertext. The same plaintext may produce different ciphertext if the cryptographic key is changed. Since the cryptographic key is a message, or a number, it is much easier to change than the function of the scrambler which is built into hardware. In fact, the cryptographic key may be changed on a message-to-message basis without much difficulty. This method is called symmetric-key encryption because the intended recipient must possess the cryptographic key used to generate the ciphertext in order to recover the plaintext. The intended recipient must also possess a function that performs the inverse of the scrambling function used to generate the ciphertext. Typically, the inverse of the scrambling function may be achieved by operating the scrambling function in reverse. If this is the case, the intended recipient must possess the same cryptographic key and scrambling function used to generate the ciphertext in order to recover the plaintext.

Even though symmetric-key encryptors make the fastest encryptors, they suffer from a few problems. The first problem is distributing cryptographic keys to authorized users in a secure fashion. A courier may be required to deliver the first cryptographic key to the users. This is time consuming and expensive. The second problem is knowing whether or not ciphertext came from a particular person. Anyone knowing the cryptographic key may encrypt or decrypt a message produced using a symmetric-key encryptor as long as they know the cryptographic key, the scrambling function, and the descrambling function. U.S. Pat. No. 4,200,770, entitled "CRYPTOGRAPHIC APPARATUS AND METHOD," discloses a device for and method of performing a cryptographic key exchange over a public channel. The method is often called a public-key key exchange method or the Diffie-Hellman key exchange method after the first two named inventors of U.S. Pat. No. 4,200,770. The Diffie-Hellman key exchange method uses the exponentiation function to allow two users to conceal and transmit their secret information to the other user. The users then combine what they received with their secret information in order to generate the same cryptographic key. To recover the secret information that was transmitted and construct the cryptographic key, an adversary would have to find the logarithm of what was transmitted. If the values involved are large enough the logarithm, or discrete log, problem is believed to be intractable. U.S. Pat. No. 4,200,770 is hereby incorporated by reference into the specification of the present invention. The Diffie-Hellman key exchange method offers a solution to the symmetric-key key distribution problem, but it does not solve the problem of verifying the identity of the sender of the ciphertext.

Asymmetric-key, or public-key, encryption was proposed as a solution to identifying the sender of the ciphertext. This problem is often referred to as being able to provide, and verify, a digital signature. Two different, but mathematically related, cryptographic keys are used in asymmetric-key, or public-key, encryption. Typically, a first, or secret, key is used to generate ciphertext while a second, or public, key is used to recover the plaintext. Each user possesses their own secret key and mathematically related public key. Each user keeps their secret key secret and makes their public key public. A first user may now generate ciphertext using their secret key and a second user may recover the corresponding plaintext using the corresponding public key. If the first user is the only person who knows the first user's secret key then the second user is assured that the ciphertext came from the first user.

In the example just given, anyone knowing the first user's public key, which is everyone, could recover the corresponding plaintext. If two users wish to communicate securely with some assurance that the message is from a particular person, the first user would encrypt the plaintext using the first user's secret key then the intended recipient's public key to encrypt the ciphertext and something to identify the first user. The recipient would then use their secret key to recover the ciphertext and the identification material. The identification material is then used to identify the public key of the first user. The first user's public key is then used to recover the plaintext. If the first user is the only one who knows the first user's secret key and the intended recipient is the only one who knows the recipient's secret key then the recipient is the only one who can recover the plaintext and is assured that the ciphertext came from the first user.

U.S. Pat. No. 4,405,829, entitled "CRYPTOGRAPHIC COMMUNICATIONS SYSTEM AND METHOD," discloses one type of public-key encryption device and method known as RSA after the three named inventors, Messrs. Rivest, Shamir, and Adleman. Although RSA uses exponentiation, an adversary is required to factor the product of two prime numbers used to generate the secret key from the chosen public key in order to recover plaintext. If the prime numbers are large enough, it is believed that the factoring problem is intractable. U.S. Pat. No. 4,405,829 is hereby incorporated into the specification of the present invention.

Taher ElGamal developed a public-key digital signature scheme based on the extended Euclidean algorithm. In this scheme, a first user generates a secret value x as the first user's secret key. The first user uses exponentiation to conceal the secret key and publishes the result (i.e., $y=g^x$ mod p) as the first user's public key. The first user then generates a random number k and uses exponentiation to conceal the random number (i.e., r=g^k mod p). The result r is one of two values that will be used as a signature for a message m from the first user. Next, the first user generates an equation that includes the message m, the secret key x, the random number k, the first half of the signature r, and a variable that represents the second half of the signature s (i.e., m=xa+ks (mod p−1)). The first user then solves the equation for s and transmits the message, the public key, and the two halves of the signature (i.e., r,s) to the recipient. The recipient, knowing p and g, checks to see if (y^r)(r^s) mod p=g^m mod p. If so, the recipient is assured that the transmission came from the first user.

The math associated with the ElGamal's digital signature scheme is complex and the digital signature is rather long. U.S. Pat. No. 4,995,082, entitled "METHOD FOR IDENTIFYING SUBSCRIBERS AND FOR GENERATING AND VERIFYING ELECTRONIC SIGNATURES IN A DATA EXCHANGE SYSTEM," discloses a method of generating a shorter digital signature in a secure manner that using different and less complex mathematics. U.S. Pat. No. 4,995,082 is hereby incorporated by reference into the specification of the present invention.

U.S. Pat. No. 5,231,668, entitled "DIGITAL SIGNATURE ALGORITHM," improves upon the digital signature of ElGamal by reducing the size of the digital signature but maintaining the mathematical complexity. U.S. Pat. No. 5,231,668 is hereby incorporated by reference into the specification of the present invention.

U.S. Pat. No. 5,497,423, entitled "METHOD OF IMPLEMENTING ELLIPTIC CURVE CRYPTOSYSTEMS IN DIGITAL SIGNATURES OR VERIFICATION AND PRIVACY COMMUNICATION"; U.S. Pat. No. 5,581,616, entitled "METHOD AND APPARATUS FOR DIGITAL SIGNATURE AUTHENTICATION"; U.S. Pat. No. 5,600,725, entitled "DIGITAL SIGNATURE METHOD AND KEY AGREEMENT METHOD"; U.S. Pat. No. 5,604,805, entitled "PRIVACY-PROTECTED TRANSFER OF ELECTRONIC INFORMATION"; U.S. Pat. No. 5,606,617, entitled "SECRET-KEY CERTIFICATES": and U.S. Pat. No. 5,761,305, entitled "KEY-AGREEMENT AND TRANSPORT PROTOCOL WITH IMPLICIT SIGNATURES," disclose either an elliptic curve version of the above-identified digital signature schemes or a different digital signature scheme. None of these elliptic curve digital signature schemes disclose a method of generating and verifying a digital signature such that the number of elliptic curve operations is minimizes as does the present invention.

The cryptographic strength of any method based on the Digital Signature Algorithm is based on the apparent intractability of finding a discrete logarithm, or discrete log, under certain conditions. In order for an adversary to recover concealed information, the adversary must be able to perform the inverse of exponentiation (i.e., a logarithm). There are mathematical methods for finding a discrete logarithm (e.g., the Number Field Sieve), but these algorithms cannot be done in any reasonable time using sophisticated computers if certain conditions are met during the construction of a transmission that conceals information (e.g., the numbers involved are large enough).

More precisely, the cryptographic strength of the Digital Signature Algorithm is based on the difficulty of computing discrete logs in a finite cyclic group. Mathematically, the discrete log problem is as follows. Let G be a finite cyclic group of order q, where g is a generator of G. Let r be a secret number such that 0<r<q. Given G, q, g, and g^r, where "^" denotes exponentiation, find r, where r is the discrete logarithm, or discrete log, of g^r. The discrete log problem is to find r.

In a Diffie-Hellman key exchange, two users (e.g., User A and User B) agree on a common G, g, and q. In practice, the most common choice for G is the integers mod n, where n is an integer.

Large digital signatures pose problems not only for the adversary but also for the users. Large digital signatures require large amounts of computational power and require large amounts of time in order to generate and use the digital signature. Cryptographers are always looking for ways to quickly generate the shortest digital signatures possible that meet the cryptographic strength required to protect the digital signature. The payoff for finding such a method is that cryptography can be done faster, cheaper, and in devices that do not have large amounts of computational power (e.g., hand-held smart-cards).

The choice of the group G is critical in a cryptographic system. The discrete log problem may be more difficult in one group and, therefore, cryptographically stronger than in another group, allowing the use of smaller parameters but maintaining the same level of security. Working with small numbers is easier than working with large numbers. Small numbers allow the cryptographic system to be higher performing (i.e., faster) and requires less storage. So, by choosing the right group, a user may be able to work with smaller numbers, make a faster cryptographic system, and get the same, or better, cryptographic strength than from another cryptographic system that uses larger numbers.

The classical choice for G in a digital signature scheme are integers mod n, where n is an integer as well. In 1985, Victor Miller and Neal Koblitz each suggested choosing G from elliptic curves. It is conjectured that choosing such a G allows the use of much smaller parameters, yet the discrete log problem using these groups is as difficult, or more difficult, than integer-based discrete log problems using larger numbers. This allows the users to generate a digital signature that has the same, or better, cryptographic strength as a digital signature generated from an integer G and is shorter than the integer-based digital signature. Since shorter digital signatures are easier to deal with, a cryptographic system based on a shorter digital signature may be faster, cheaper, and implemented in computationally-restricted devices. So, an elliptic curve Digital Signature Algorithm is an improvement over an integer-based Digital Signature Algorithm.

More precisely, an elliptic curve is defined over a field F. An elliptic curve is the set of all ordered pairs (x,y) that satisfy a particular cubic equation over a field F, where x and y are each members of the field F. Each ordered pair is called a point on the elliptic curve. In addition to these points, there is another point O called the point at infinity. The infinity point is the additive identity (i.e., the infinity point plus any other point results in that other point). For cryptographic purposes, elliptic curves are typically chosen with F as the integers mod p for some large prime number p (i.e., $F_p$) or as the field of 2^m elements (i.e., $F_2m$).

Multiplication or, more precisely, scalar multiplication is the dominant operation in elliptic curve cryptography. The speed at which multiplication can be done determines the performance of an elliptic curve method.

Multiplication of a point P on an elliptic curve by an integer k may be realized by a series of additions (i.e., kP=P+P+ . . . +P, where the number of Ps is equal to k). This is very easy to implement in hardware since only an elliptic adder is required, but it is very inefficient. That is, the number of operations is equal to k which may be very large.

The classical approach to elliptic curve multiplication is a double and add approach. For example, if a user wishes to realize kP, where k=25 then 25 is first represented as a binary expansion of 25. That is, 25 is represented as a binary number 11001. Next, P is doubled a number of times equal to the number of bits in the binary expansion minus 1. For ease in generating an equation of the number of operations, the number of doubles is taken as m rather than m−1. The price for simplicity here is being off by 1. In this example, the doubles are 2P, 4P, 8P, and 16P. The doubles correspond to the bit locations in the binary expansion of 25 (i.e., 11001), except for the 1s bit. The doubles that correspond to bit locations that are 1s are then added along with P if the 1s bit is a 1. The number of adds equals the number of 1s in the binary expansion. In this example, there are three additions since there are three is in the binary expansion of 25 (i.e., 11001). So, 25P=16P+8P+P.

On average, there are m/2 1s in k. This results in m doubles and m/2 additions for a total of 3 m/2 operations. Since the number of bits in k is always less than the value of $k_1$ the double and add approach requires fewer operations than does the addition method described above. Therefore, the double and add approach is more efficient (i.e., faster) than the addition approach.

While working on an elliptic curve allows smaller parameters relative to a modular arithmetic based system offering the same security, some of the efficiency advantage of smaller parameters is offset by the added complexity of doing arithmetic on an elliptic curve as opposed to ordinary modular arithmetic. For purposes of determining efficiency, elliptic doubles and elliptic additions are often grouped and considered elliptic operations. To gain even more efficiency advantages by going to elliptic curves, cryptographers seek ways to reduce the cost of an elliptic curve operation, or reduce the number of elliptic operations required. An elliptic curve method that requires fewer operations, or more efficiently executable operations, would result in an increase in the speed, or performance, of any device that implements such a method.

It is no more costly to do elliptic curve subtractions than it is to do elliptic curve additions. Therefore, a doubles and add approach to doing elliptic curve multiplication may be modified to include subtraction where appropriate. There are an infinite number of ways to represent an integer as a signed binary expansion. The negative 1s in a signed binary expansion indicate subtraction in a double/add/subtract method while the positive 1s in the signed binary expansion indicate addition in the double/add/subtract method. For example, 25 may be represented as an unsigned binary number 11001 (i.e., 16+8+1=25) or as one possible signed binary number "1 0−1 0 0 1" (i.e., 32−8+1=25).

In an article entitled "Speeding Up The Computations On An Elliptic Curve Using Addition-Subtraction Chains", authored by Francois Morain and Jorge Olivos, published in *Theoretical Informatics and Applications*, Vol. 24, No. 6, 1990, pp. 531–544, the authors disclose an improvement to the double-add-subtract method mentioned above by placing a restriction on the signed binary expansion that results in fewer elliptic additions being required to do an elliptic curve multiplication and, therefore, increase the performance (i.e., speed) of elliptic curve multiplication. Messrs. Morain and Olivos proposed generating a signed binary expansion such that no two adjacent bit locations in the signed binary expansion are non-zero (i.e., two is, irrespective of polarity, may not be next to each other). Such a signed binary expansion is called a non-adjacent form (NAF) of a signed binary expansion. It has been shown that a NAF signed binary expansion is unique (i.e., each integer has only one NAF signed binary expansion) and contains the minimum number of 1s, irrespective of polarity. By minimizing the 1s, the number of additions is minimized. The improvement proposed by Messrs. Morain and Olivos still requires m doubles but only requires an average of m/3 additions for a total of 4m/3 elliptic curve operations. This is less than the 3m/2 elliptic curve operations required by the classical double and add method described above.

The most expensive part of the digital signature verification process is that of computing the expressions cW+gR, where c and g are integers and W and R are points on the curve. Thus, it is particularly important to optimize the efficiency of this operation.

The most straightforward way to evaluate cW+gR is to evaluate cW and gR separately and add the results. However, it turns out to be more efficient to evaluate the entire expression at once. Such a method is commonly referred to as twin multiplication.

The simplest twin multiplication method was first disclosed by E. G. Straus and later rediscovered by A. Shamir and disclosed in an article by T. ElGamal entitled "A Public Key Cryptosystem and a Signature Scheme Based on Discrete Logarithms," *IEEE Transactions On Information Theory*, Vol. IT-31, No. 4, July 1985. The method is based on the binary method which uses an ordinary binary expansion of c and g. Therefore, the Straus-Shamir method is a double-add method for twin multiplication. It is more efficient to use the analogous method that works with signed binary expansions; this is called the double-add-subtract method for twin multiplication. Like the binary method, the double-add-subtract method for twin multiplication works in a general group setting.

SUMMARY OF THE INVENTION

It is an object of the present invention to generate and verify a cryptographic digital signature in a manner that minimizes the number of elliptic curve operations.

It is another object of the present invention to generate and verify a cryptographic digital signature in a manner that minimizes the number of elliptic curve operations using binary expansion in joint sparse form.

The present invention is a method of generating and verifying a cryptographic digital signature using joint sparse expansion.

The first step of the method is selecting, by a signer, a finite field, an elliptic curve, a point P on the elliptic curve, an integer w, and an integer k.

The second step of the method is generating a point W=wP and a point K=kP.

The third step of the method is transforming K to a bit string K*.

The fourth step of the method is combining K*, W, and a message M in a first manner to produce h.

The fifth step of the method is combining K*, W, and M in a second manner to produce c.

The sixth step of the method is generating s.

The seventh step of the method is forming the cryptographic digital signature as (K*,s).

The eighth step of the present method is acquiring, by a verifier, the finite field F, the elliptic curve E, the point P, the point W, the message M, and the cryptographic digital signature (K*,s).

The ninth step of the present is computing h and c.

The tenth step of the present method is selecting $(n_0, n_1)$.

The eleventh step of the method is generating binary expansions of $n_0$ and $n_1$ in joint sparse form.

The twelfth step of the method is computing $Q=n_0P+n_1W$ via twin multiplication and a double-add-subtract method with the binary expansions in joint sparse form.

The thirteenth step of the present method is transforming, by the verifier, Q to Q* in the same manner as K was transformed to K* in the third step 3.

The fourteenth, and last, step of the method is verifying the digital signature if $Q^*=K^*$.

DETAILED DESCRIPTION

Figure 1:
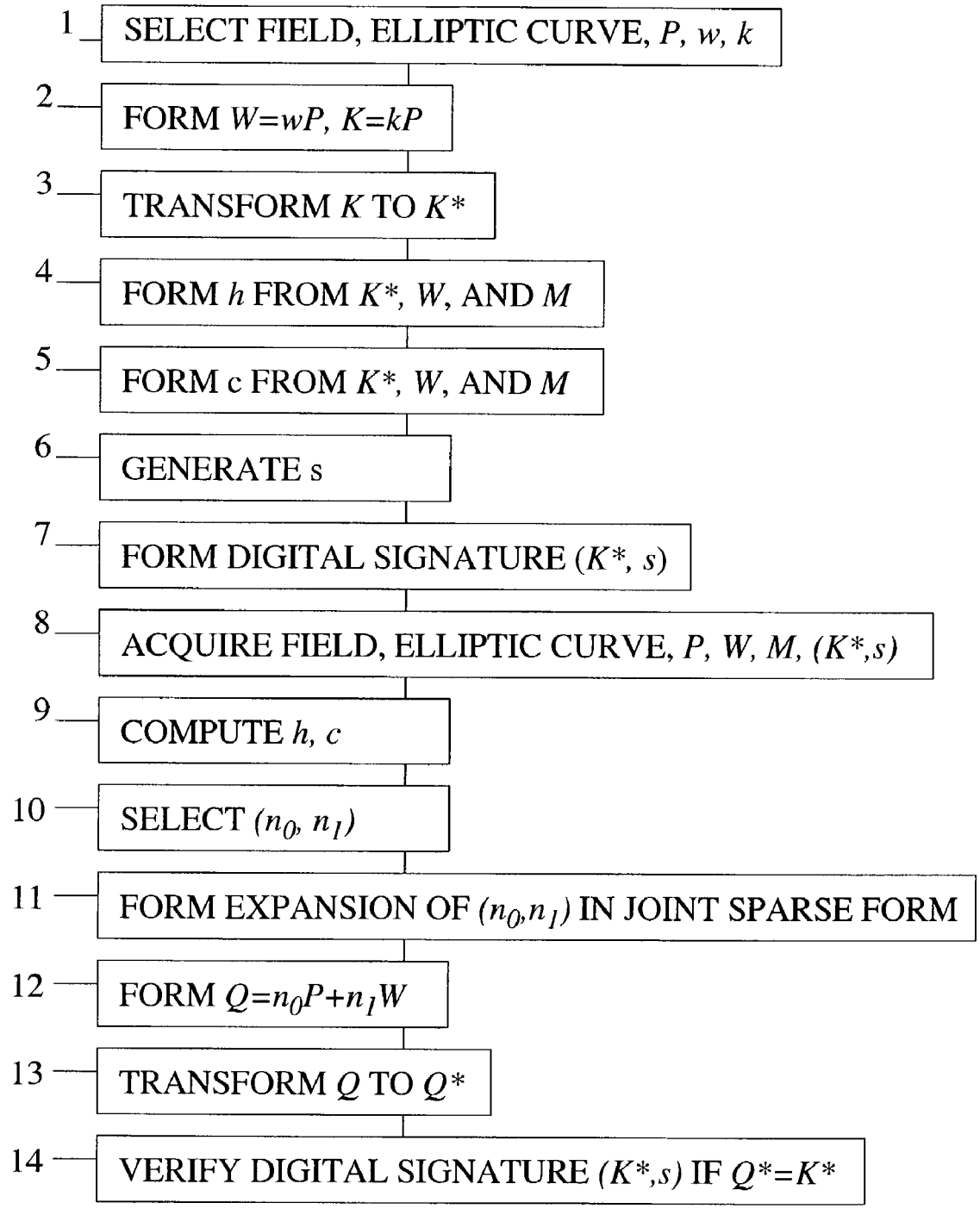
FIG. 1 is a list of steps of the digital signature method of the present invention for a first type of digital signature.

The present invention is a method of generating and verifying a cryptographic digital signature using joint sparse expansion. The present invention uses two families of elliptic curves to generate and verify two types of digital signatures. FIG. 1 lists the steps of the present invention for generating and verifying the first type of digital signature.

The first step 1 of the present method is acquiring or selecting, by a signer, a finite field F, an elliptic curve E, a point P on the elliptic curve, an integer w, and an integer k. The elliptic curve is defined over the finite field F. The number of points on the elliptic curve is divisible by q, where q is a prime number. The point P on the elliptic curve is of order q. Each user (i.e., signer and verifier) knows the order q. E, P, and q may be publicly known parameters.

The second step 2 of the present method is generating, by the signer, a point W=wP and a point K=kP.

The third step 3 of the present method is transforming, by the signer, K to a bit string K*. A suitable transformation is to make K* the x coordinate of the point K.

The fourth step 4 of the present method is combining, by the signer, K*, W, and a message M in a first manner to produce h, where h is an integer modulo q.

The fifth step 5 of the present method is combining, by the signer, K*, W, and the message M in a second manner to produce c, where c is an integer modulo q.

The sixth step 6 of the present method is generating, by the signer, s using one of the following equations:

$$s=hw+ck\,(mod\ q),$$

$$s=(hw+c)/k\,(mod\ q),\text{ and}$$

$$s=(hk+c)/w\,(mod\ q).$$

The seventh step 7 of the present method is forming, by the signer, the cryptographic digital signature as (K*,s).

The eighth step 8 of the present method is acquiring, by a verifier, the finite field F, the elliptic curve E, the point P, the point W, the message M, and the cryptographic digital signature (K*,s).

The ninth step 9 of the present method is computing, by the verifier, h and c in the same manner as the signer did in the fourth step 4 and the fifth step 5, respectively.

The tenth step 10 of the present method is selecting, by the verifier, a pair of components $(n_0, n_1)$ from the following pairs of components:

$$(n_0, n_1)=(sc^{-1}(mod\ q), -hc^{-1}(mod\ q)),$$

$$(n_0, n_1)=(cs^{-1}(mod\ q), hs^{-1}(mod\ q)),\text{ and}$$

$$(n_0, n_1)=(-ch^{-1}(mod\ q), sh^{-1}(mod\ q)).$$

The pair of components selected in the tenth step 10 corresponds, according to position, to the equation selected in the sixth step 6. For example, if the first equation in the list of equations was selected in the sixth step 6 then the first pair of components in the list of pairs of components is selected in the tenth step 10.

Figure 2:
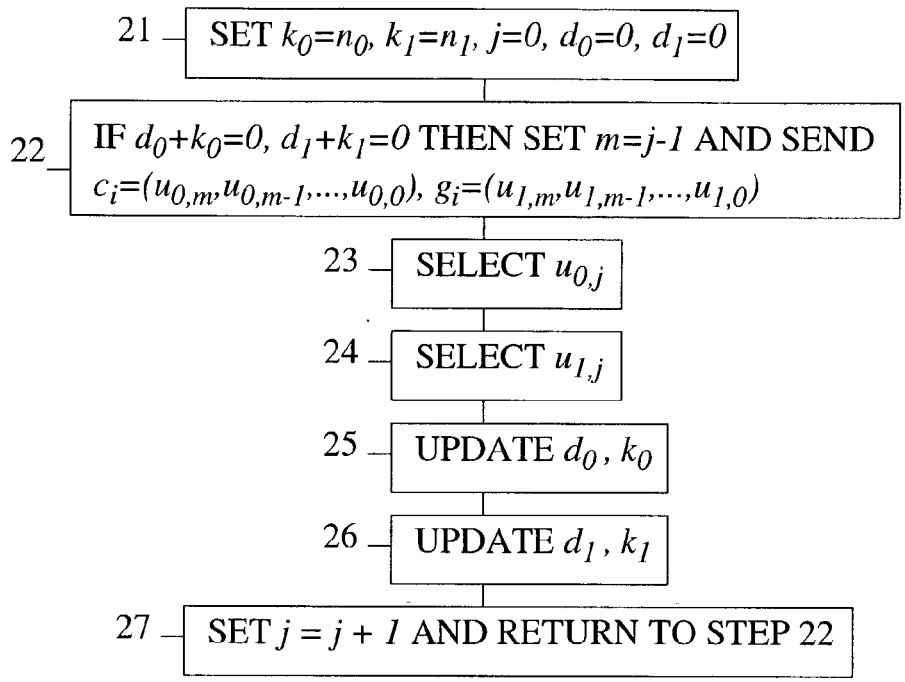
FIG. 2 is a list of steps of the binary expansion in joint sparse form of the present invention.

The eleventh step 11 of the present method is generating, by the verifier, binary expansions of $n_0$ and $n_1$ to minimize a number of nonzero columns for the binary expansions. Such an expansion is referred to in the present invention as a binary expansion in joint sparse form. FIG. 2, described below, lists steps for performing a binary expansion on $(n_0, n_1)$ to minimize the number of nonzero columns. FIG. 2 is described in detail below.

The twelfth step 12 of the present method listed in FIG. 1 is computing, by the verifier, a point $Q=n_0P+n_1W$ via twin multiplication and a double-add-subtract method with the binary expansions generated in the eleventh step 11. A double-add-subtract method is described in the Background section above.

The thirteenth step 13 of the present method is transforming, by the verifier, Q to Q* in the same manner as K was transformed to K* in the third step 3.

The fourteenth, and last, step 14 of the present method is verifying, by the verifier, the cryptographic digital signature (K*,s) by determining whether or not $Q^*=K^*$. If $Q^*=K^*$ the digital signature is verified. Otherwise, the digital signature is not verified and is rejected.

FIG. 2 is a list of steps for generating the binary expansions of $n_0$ and $n_1$ in joint sparse form in the eleventh step 11 listed in FIG. 1 and described above.

The first step 21 of the method of generating a binary expansion in joint sparse form is setting $k_0=n_0$, $k_1=n_1$, $j=0$, $d_0=0$, and $d_1=0$.

If $d_0+k_0=0$ and $d_1+k_1=0$ then the second step 22 of the method of generating a binary expansion in joint sparse form is setting $m=j-1$ and putting out $(u_{0,m}, u_{0,m-1}, \ldots, u_{0,0})$ as the binary expansion for $n_0$ and $(u_{1,m}, u_{1,m-1}, \ldots, u_{1,0})$ as the binary expansion for $n_1$ and stopping. Otherwise, proceeding to the next step.

The third step 23 of the method of generating a binary expansion in joint sparse form is selecting $u_{0,j}$. The steps for selecting $u_{0,j}$ are listed in FIG. 3 and described below.

The fourth step 24 of the method of generating a binary expansion in joint sparse form is selecting $u_{1,j}$. The steps for selecting $u_{1,j}$ are listed in FIG. 4 and described below.

The fifth step 25 of the method of generating a binary expansion in joint sparse form is updating $d_0$ and $k_0$. The steps for updating $d_0$ and $k_0$ are listed in FIG. 5 and described below.

The sixth step 26 of the method of generating a binary expansion in joint sparse form is updating $d_1$ and $k_1$. The steps for updating $d_1$ and $k_1$ are listed in FIG. 5 and described below.

The seventh, and last, step 27 of the method of generating a binary expansion in joint sparse form is setting $j=j+1$ and returning to the second step 22.

Figure 3:
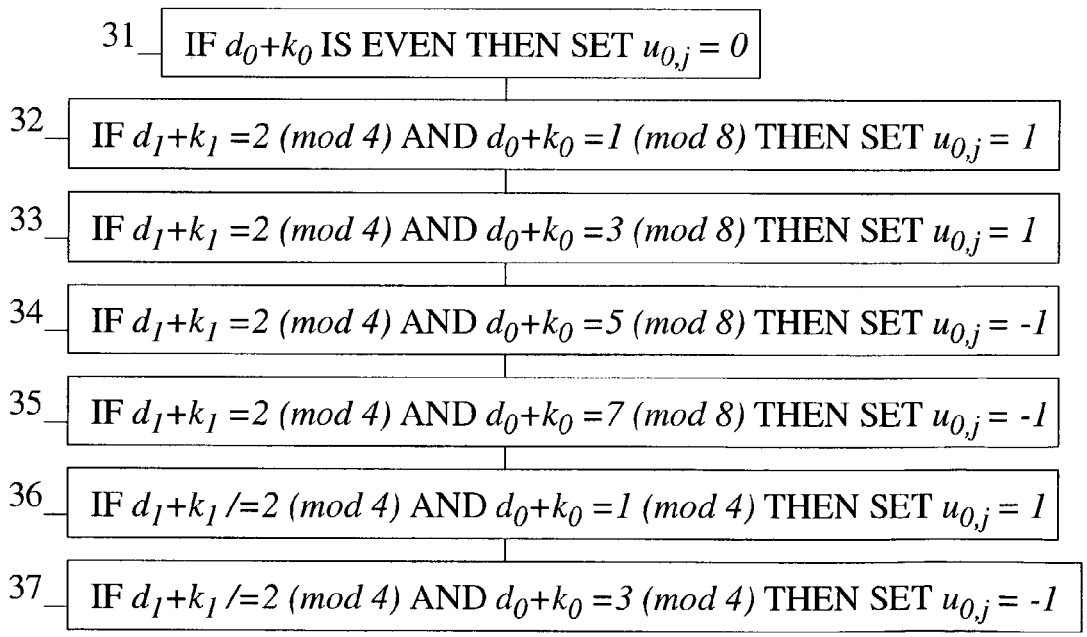
FIG. 3 is a list of steps of selecting $u_{0,j}$.

FIG. 3 is a list of steps for selecting $u_{0,j}$ in the method of generating the binary expansions in joint sparse form listed in FIG. 2 and described above.

If $d_0+k_0$ is even then the first step 31 of the method of selecting $u_{0,j}$ is setting $u_{0,j}=0$.

If $d_1+k_1=2 \pmod 4$ and $d_0+k_0=1 \pmod 8$ then the second step 32 of the method of selecting $u_{0,j}$ is setting $u_{0,j}=1$.

If $d_1+k_1=2 \pmod 4$ and $d_0+k_0=3 \pmod 8$ then the third step 33 of the method of selecting $u_{0,j}$ is setting $u_{0,j}=1$.

If $d_1+k_1=2 \pmod 4$ and $d_0+k_0=5 \pmod 8$ then the fourth step 34 of the method of setting $u_{0,j}$ is setting $u_{0,j}=-1$.

If $d_1+k_1=2 \pmod 4$ and $d_0+k_0=7 \pmod 8$ then the fifth step 35 of the method of setting $u_{0,j}$ is setting $u_{0,j}=1$.

If $d_1+k_1$ is not equal to 2 (mod 4) and $d_0+k_0=1 \pmod 4$ then the sixth step 36 of the method of setting $u_{0,j}$ is setting $u_{0,j}=1$.

If $d_1+k_1$ is not equal to 2 (mod 4) and $d_0+k_0=3 \pmod 4$ then the seventh, and last, step 37 of the method of setting $u_{0,j}$ is setting $u_{0,j}=-1$.

Figure 4:
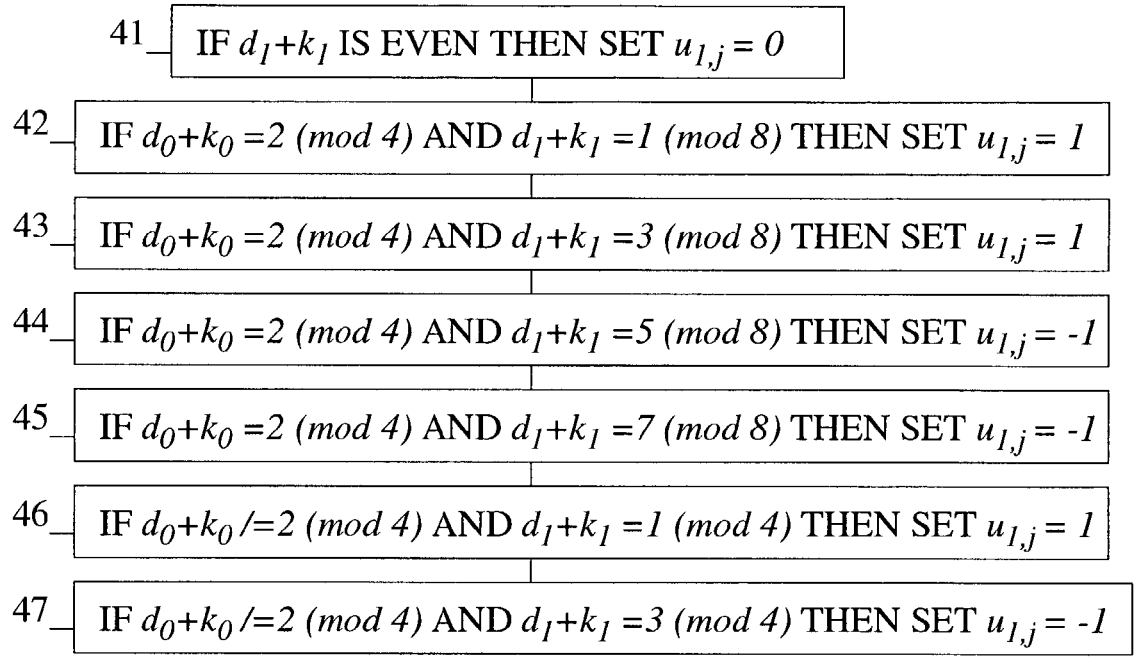
FIG. 4 is a list of steps of selecting $u_{1,j}$.

FIG. 4 is a list of steps for selecting $u_{1,j}$ in the method of generating the binary expansions in joint sparse form listed in FIG. 2 and described above.

If $d_1+k_1$ is even then the first step 41 of the method of selecting $u_{1,j}$ is setting $u_{1,j}=0$.

If $d_0+k_0=2 \pmod 4$ and $d_1+k_1=1 \pmod 8$ then the second step 42 of the method of selecting $u_{1,j}$ is setting $u_{1,j}=1$.

If $d_0+k_0=2 \pmod 4$ and $d_1+k_1=3 \pmod 8$ then the third step 43 of the method of selecting $u_{1,j}$ is setting $u_{1,j}=1$.

If $d_0+k_0=2 \pmod 4$ and $d_1+k_1=5 \pmod 8$ then the fourth step 44 of the method of selecting $u_{1,j}$ is setting $u_{1,j}=-1$.

If $d_0+k_0=2 \pmod 4$ and $d_1+k=7 \pmod 8$ then the fifth step 45 of the method of selecting $u_{1,j}$ is setting $u_{1,j}=-1$.

If $d_0+k_0$ is not equal to 2 (mod 4) and $d_1+k_1=1 \pmod 4$ then the sixth step 46 of the method of selecting $u_{1,j}$ is setting $u_{1,j}=1$.

If $d_0+k_0$ is not equal to 2 (mod 4) and $d_1+k_1=3 \pmod 4$ then the seventh, and last, step 47 of the method of selecting $u_{1,j}$ is setting $u_{1,j}=-1$.

Figure 5:
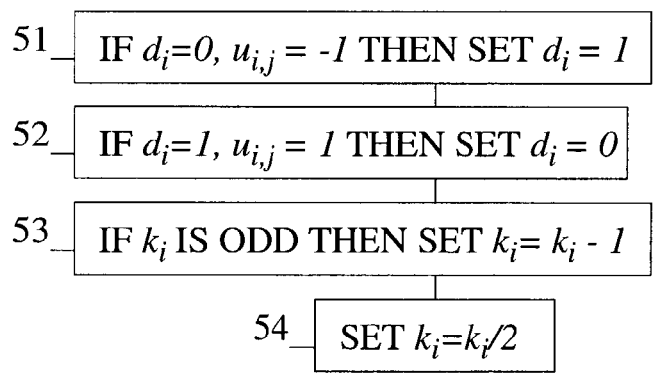
FIG. 5 is a list of steps of updating values.

FIG. 5 is a list of steps for updating $d_0$ and $k_1$ (i.e., step 25) and updating $d_1$ and $k_1$ (i.e., step 26) in the method of generating the binary expansions in joint sparse form listed in FIG. 2 and described above. For updating $d_0$ and $k_0$ (i.e., step 25), subscript i is set to 0. For updating $d_1$ and $k_1$ (i.e., step 26), subscript i is set to 1.

If $d_i=0$ and $u_{i,j}=-1$, then the first step 51 of the method of updating $d_i$ and $k_i$ is setting $d_i=1$.

If $d_i$ and $u_{i,j}=1$, then the second step 52 of the method of updating $d_i$ and $k_i$ is setting $d_i=0$.

If $k_i$ is odd then the third step 53 of the method of updating $d_i$ and $k_i$ is setting $k_i=k_i-1$.

The fourth, and last, step 54 of the method of updating $d_i$ and $k_i$ is setting $k_{0i}=k_{0i}/2$.

Figure 6:
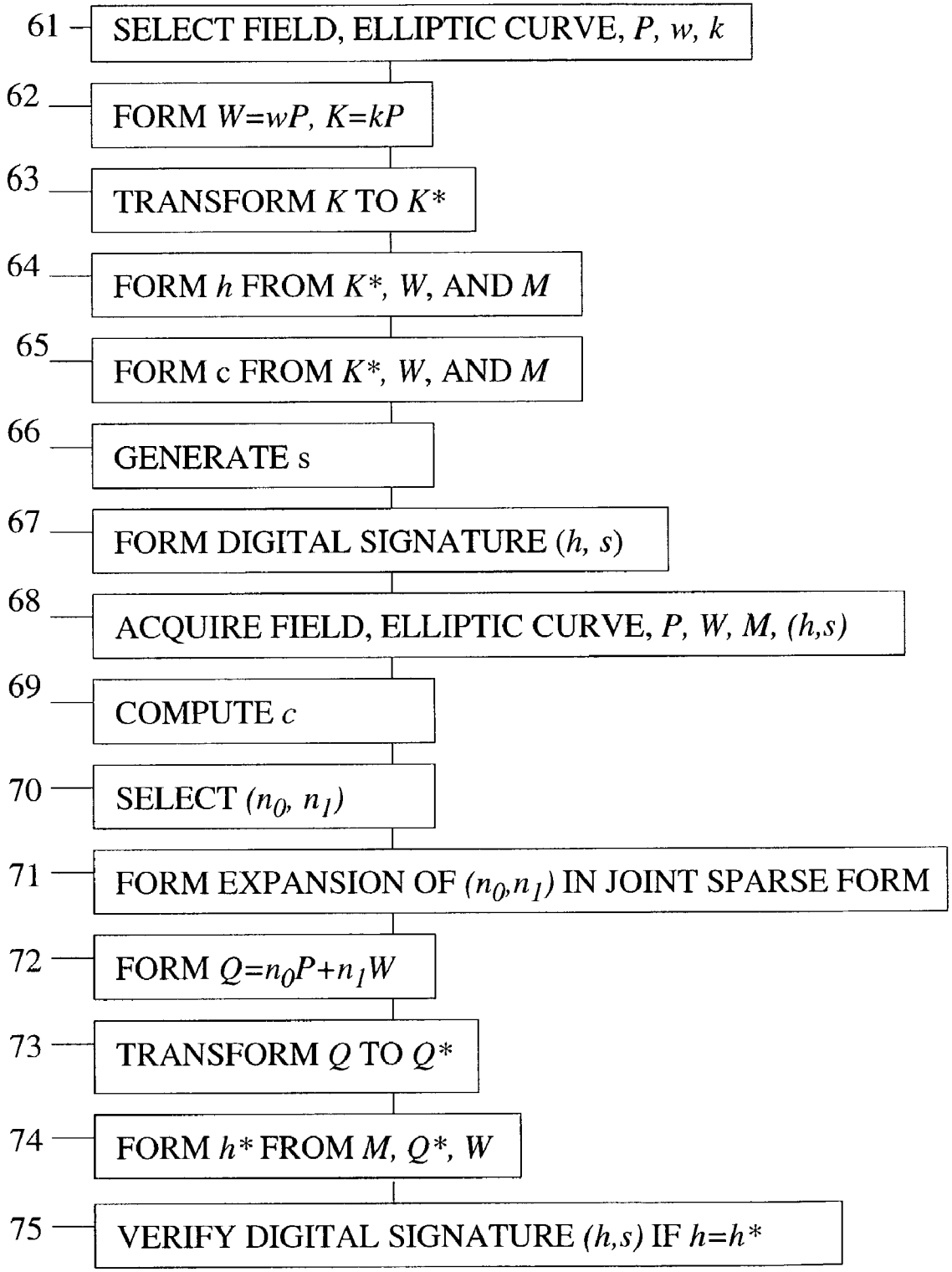
FIG. 6 is a list of steps of the digital signature method of the present invention for a first type of digital signature.

FIG. 6 lists the steps of the present invention for generating and verifying the second type of digital signature.

The first step 61 of the present method is acquiring or selecting, by a signer, a finite field F, an elliptic curve E, a point P on the elliptic curve, an integer w, and an integer k. The elliptic curve is defined over the finite field F. The number of points on the elliptic curve is divisible by q, where q is a prime number. The point P on the elliptic curve is of order q. Each user (i.e., signer and verifier) knows the order q. E, P, and q may be publicly known parameters.

The second step 62 of the present method is generating, by the signer, a point $W=wP$ and a point $K=kP$.

The third step 63 of the present method is transforming, by the signer, K to a bit string K*. A suitable transformation is to make K* the x coordinate of the point K.

The fourth step 64 of the present method is combining, by the signer, K*, W, and a message M in a first manner to produce h, where h is an integer modulo q.

The fifth step 65 of the present method is combining, by the signer, K*, W, and the message M in a second manner to produce c, where c is an integer modulo q.

The sixth step 66 of the present method is generating, by the signer, s using one of the following equations:

$$s=hw+ck \pmod q,$$

$$s=(hw+c)/k \pmod q, \text{ and}$$

$$s=(hk+c)/w \pmod q.$$

The seventh step 67 of the present method is forming, by the signer, the cryptographic digital signature as (h,s).

The eighth step 68 of the present method is acquiring, by a verifier, the finite field F, the elliptic curve E, the point P, the point W, the message M, and the cryptographic digital signature (h,s).

The ninth step 69 of the present method is computing, by the verifier, c in the same manner as the signer did in the fifth step 65, respectively.

The tenth step 70 of the present method is selecting, by the verifier, a pair of components $(n_0, n_1)$ from the following pairs of components:

$$(n_0, n_1) \; (sc^{-1}(mod \; q), -hc^{-1}(mod \; q)),$$

$$(n_0, n_1)=(-cs^{-1}(mod \; q), hs^{-1}(mod \; q)), \text{ and}$$

$$(n_0, n_1)=(-ch^{-1}(mod \; q), sh^{-1}(mod \; q)).$$

The pair of components selected in the tenth step 70 corresponds, according to position, to the equation selected in the sixth step 66. For example, if the first equation in the list of equations was selected in the sixth step 66 then the first pair of components in the list of pairs of components is selected in the tenth step 70.

The eleventh step 71 of the present method is generating, by the verifier, binary expansions of $n_0$ and $n_1$ to minimize a number of nonzero columns for the binary expansions. FIG. 2, described above, lists the steps for performing a binary-expansion on $(n_0, n_1)$ to minimize the number of nonzero columns.

The twelfth step 72 of the present method listed in FIG. 6 is computing, by the verifier, a point $Q=n_0P+n_1W$ via twin multiplication and a double-add-subtract method with the binary expansions generated in the eleventh step 71. A double-add-subtract method is described in the Background section above.

The thirteenth step 73 of the present method is transforming, by the verifier, Q to Q* in the same manner as K was transformed to K* in the third step 63.

The fourteenth step 74 of the present method is combining, by the verifier, M, Q*, and W to produce h* in the same manner as M, K*, and W were combined in the fourth step 64.

The fifteenth, and last, step 75 of the present method is verifying the cryptographic digital signature (h,s) by determining whether or not h=h*. If h=h* then verify the digital signature. Otherwise, reject the digital signature and do not verify it.

What is claimed is:

1. A method of generating and verifying a cryptographic digital signature using joint sparse expansion, comprising the steps of:

a) selecting, by a signer, a finite field; an elliptic curve defined over the selected finite field, where the number of points on the elliptic curve is divisible by q, where q is a prime number; a point P of order q on the elliptic curve; an integer w; and an integer k;

b) generating, by the signer, a point W=wP and a point K=kP;

c) transforming, by the signer, K to a bit string K*;

d) combining, by the signer, K*, W, and a message M in a first manner to produce h, where h is an integer modulo q;

e) combining, by the signer, K*, W, and the message M in a second manner to produce c, where c is an integer modulo q;

f) generating, by the signer, s using an equation selected from the group of equations consisting of s=hw+ck (mod q), s=(hw+c)/k (mod q), and s=(hk+c)/w (mod q);

g) forming, by the signer, the cryptographic digital signature as (K*,s);

h) acquiring, by a verifier, the finite field, the elliptic curve, the point P, the point W, the message M, and the cryptographic digital signature (K*,s);

i) computing, by the verifier, h and c in the same manner as the signer did in step (d) and step (e), respectively;

j) selecting, by the verifier, a pair of components $(n_0, n_1)$ from the group of pairs of components consisting of $(sc^{-1} \pmod{q}, -hc^{-1} \pmod{q})$, $(cs^{-1} \pmod{q}, hs^{-1} \pmod{q})$ and $(-ch^{-1} \pmod{q}, sh^{-1} \pmod{q})$, where the pair of components selected corresponds according to position to the equation selected in step (f);

k) generating, by the verifier, binary expansions of $n_0$ and $n_1$ to minimize a number of nonzero columns for the binary expansions;

l) computing, by the verifier, a point $Q=n_0P+n_1W$ via twin multiplication and a double-add-subtract method with the binary expansions generated in step (k);

m) transforming, by the verifier, Q to Q* in the same manner as K was transformed to K* in step (c); and n) verifying, by the verifier, the cryptographic digital signature (K*,s) if Q*=K*, otherwise rejecting the cryptographic digital signature (K*,s).

2. The method of claim 1, wherein said step of generating, by the verifier, binary expansions of $n_0$ and $n_1$ to minimize a number of nonzero columns for the binary expansions is comprised of the steps of:

a) setting $k_0=n_0$, $k_1=n_1$, j=0, $d_0=0$, and $d_1=0$;

b) if $d_0+k_0=0$ and $d_1+k_1=0$ then setting m=j−1 and putting out $(u_{0,m}, u_{0,m-1}, \ldots, u_{0,0})$ as the binary expansion for $n_0$ and $(u_{1,m}, u_{1,m-1}, \ldots, u_{1,0})$ as the binary expansion for $n_1$ and stopping, otherwise proceeding to the next step;

c) selecting $u_{0,j}$;

d) selecting $u_{1,j}$;

e) updating $d_0$ and $k_0$;

f) updating $d_1$ and $k_1$; and g) setting j=j+1 and returning to step (b).

3. The method of claim 2, wherein said step of selecting $u_{0,j}$ is comprised of the steps of:

a) if $d_0+k_0$ is even, then setting $u_{0,j}=0$;

b) if $d_1+k_1=2 \pmod 4$ and $d_0+k_0=1 \pmod 8$ then setting $u_{0,j}=1$;

c) if $d_1+k_1=2 \pmod 4$ and $d_0+k_0=3 \pmod 8$ then setting $u_{0,j}=1$;

d) if $d_1+k_1=2 \pmod 4$ and $d_0+k_0=5 \pmod 8$ then setting $u_{0,j}=-1$;

e) if $d_1+k_1=2 \pmod 4$ and $d_0+k_0=7 \pmod 8$, then setting $u_{0,j}=-1$;

f) if $d_1+k_1$ is not equal to 2 (mod 4) and $d_0+k_0=1 \pmod 4$ then setting $u_{0,j}=1$; and g) if $d_1+k_1$ is not equal to 2 (mod 4) and $d_0+k_0=3 \pmod 4$ then setting $u_{0,j}=-1$.

4. The method of claim 2, wherein said step of selecting $u_{1,j}$ is comprised of the steps of:

a) if $d_1+k_1$ is even, then setting $u_{1,j}=0$;

b) if $d_0+k_0=2 \pmod 4$ and $d_1+k_1=1 \pmod 8$ then setting $u_{1,j}=1$;

c) if $d_0+k_0=2 \pmod 4$ and $d_1+k_1=3 \pmod 8$ then setting $u_{1,j}=1$;

d) if $d_0+k_0=2 \pmod 4$ and $d_1+k_1=5 \pmod 8$ then setting $u_{1,j}=-1$;

e) if $d_0+k_0=2 \pmod 4$ and $d_1+k_1=7 \pmod 8$, then setting $u_{1,j}=-1$;

f) if $d_0+k_0$ is not equal to 2 (mod 4) and $d_1+k_1=1 \pmod 4$ then setting $u_{1,j}=1$; and g) if $d_0+k_0$ is not equal to 2 (mod 4) and $d_1+k_1=3 \pmod 4$ then setting $u_{1,j}=-1$.

5. The method of claim 2, wherein said step of updating $d_0$ and $k_0$ is comprised of the steps of:

a) if $d_0=0$ and $u_{0,j}=-1$, then setting $d_0=1$;

b) if $d_0=1$ and $u_{0,j}=1$, then setting $d_0=0$;

c) if $k_0$ is odd, then setting $k_0=k_0-1$; and d) setting $k_0=k_0/2$.

6. The method of claim 2, wherein said step of updating $d_1$ and $k_1$ is comprised of the steps of:

a) if $d_1=0$ and $u_{1,j}=-1$, then setting $d_1=1$;

b) if $d_1=1$ and $u_{1,j}=1$, then setting $d_1=0$;

c) if $k_1$ is odd, then setting $k_1=k_1-1$; and d) setting $k_1=k_1/2$.

7. A method of generating and verifying a cryptographic digital signature using joint sparse expansion, comprising the steps of:

a) selecting, by a signer, a finite field; an elliptic curve defined over the selected finite field, where the number of points on the elliptic curve is divisible by q, where q is a prime number; a point P of order q on the elliptic curve; an integer w; and an integer k;

b) generating, by the signer, a point W=wP and a point K=kP;

c) transforming, by the signer, K to a bit string K*;

d) combining, by the signer, K*, W, and a message M in a first manner to produce h, where h is an integer modulo q;

e) combining, by the signer, K*, W, and the message M in a second manner to produce c, where c is an integer modulo q;

f) generating, by the signer, s using an equation selected from the group of equations consisting of s=hw+ck (mod q), s=(hw+c)/k (mod q), and s=(hk+c)/w (mod q);

g) forming, by the signer, the cryptographic digital signature as (h,s);

h) acquiring, by a verifier, the finite field, the elliptic curve, the point P, the point W, the message M, and the cryptographic digital signature (h,s);

i) computing, by the verifier, c in the same manner as the signer did in step (d) and step (e), respectively;

j) selecting, by the verifier, a pair of components $(n_0, n_1)$ from the group of pairs of components consisting of $(sc^{-1} \pmod{q}, -hc^{-1} \pmod{q})$, $(cs^{-1} \pmod{q}, hs^{-1} \pmod{q})$ and $(-ch^{-1} \pmod{q}, sh^{-1} \pmod{q})$, where the pair of components selected corresponds according to position to the equation selected in step (f);

k) generating, by the verifier, binary expansions of $n_0$ and $n_1$ to minimize a number of nonzero columns for the binary expansions;

l) computing, by the verifier, a point $Q=n_0P+n_1W$ via twin multiplication and a double-add-subtract method with the binary expansions generated in step (k);

m) transforming, by the verifier, Q to Q* in the same manner as K was transformed to K* in step (c); and n) combining, by the verifier, M, Q*, and W to produce h* in the same manner as M, K*, and W were combined in step (d); and o) verifying, by the verifier, the cryptographic digital signature (h,s) if h=h*, otherwise rejecting the cryptographic digital signature (h,s).

8. The method of claim 7, wherein said step of generating, by the verifier, binary expansions of $n_0$ and $n_1$ to minimize a number of nonzero columns for the binary expansions is comprised of the steps of:

a) setting $k_0=n_0$, $k_1=n_1$, $j=0$, $d_0=0$, and $d_1=0$;

b) if $d_0+k_0=0$ and $d_1+k_1=0$ then setting $m=j-1$ and putting out $(u_{0,m}, u_{0,m-1}, \ldots, u_{0,0})$ as the binary expansion for $n_0$ and $(u_{1,m}, u_{1,m-1}, \ldots, u_{1,0})$ as the binary expansion for $n_1$ and stopping, otherwise proceeding to the next step;

c) selecting $u_{0,j}$;

d) selecting $u_{1,j}$;

e) updating $d_0$ and $k_0$;

f) updating $d_1$ and $k_1$; and g) setting $j=j+1$ and returning to step (b).

9. The method of claim 8, wherein said step of selecting $u_{0,j}$ is comprised of the steps of:

a) if $d_0+k_0$ is even, then setting $u_{0,j}=0$;

b) if $d_1+k_1=2$ (mod 4) and $d_0+k_0=1$ (mod 8) then setting $u_{0,j}=1$;

c) if $d_1+k_1=2$ (mod 4) and $d_0+k_0=3$ (mod 8) then setting $u_{0,j}=1$;

d) if $d_1+k_1=2$ (mod 4) and $d_0+k_0=5$ (mod 8) then setting $u_{0,j}=-1$;

e) if $d_1+k_1=2$ (mod 4) and $d_0+k_0=7$ (mod 8), then setting $u_{0,j}=-1$;

f) if $d_1+k_1$ is not equal to 2 (mod 4) and $d_0+k_0=1$ (mod 4) then setting $u_{0,j}=1$; and g) if $d_1+k_1$ is not equal to 2 (mod 4) and $d_0+k_0=3$ (mod 4) then setting $u_{0,j}=-1$.

10. The method of claim 8, wherein said step of selecting $u_{1,j}$ is comprised of the steps of:

a) if $d_1+k_1$ is even, then setting $u_{1,j}=0$;

b) if $d_0+k_0=2$ (mod 4) and $d_1+k_1=1$ (mod 8) then setting $u_{1,j}=1$;

c) if $d_0+k_0=2$ (mod 4) and $d_1+k_1=3$ (mod 8), then setting $u_{1,j}=1$;

d) if $d_0+k_0=2$ (mod 4) and $d_1+k=5$ (mod 8) then setting $u_{1,j}=-1$;

e) if $d_0+k_0=2$ (mod 4) and $d_1+k=7$ (mod 8), then setting $u_{1,j}=-1$;

f) if $d_0+k_0$ is not equal to 2 (mod 4) and $d_1+k_1=1$ (mod 4) then setting $u_{1,j}=1$; and g) if $d_0+k_0$ is not equal to 2 (mod 4) and $d_1+k_1=3$ (mod 4) then setting $u_{1,j}=-1$.

11. The method of claim 8, wherein said step of updating $d_0$ and $k_0$ is comprised of the steps of:

a) if $d_0=0$ and $u_{0,j}=-1$, then setting $d_0=1$;

b) if $d_0=1$ and $u_{0,j}=1$, then setting $d_0=0$;

c) if $k_0$ is odd, then setting $k_0=k_0-1$; and d) setting $k_0=k_0/2$.

12. The method of claim 8, wherein said step of updating $d_1$ and $k_1$ is comprised of the steps of:

a) if $d_1=0$ and $u_{1,j}=-1$, then setting $d_1=1$;

b) if $d_1=1$ and $u_{1,j}=1$, then setting $d_1=0$;

c) if $k_1$ is odd, then setting $k_1=k_1-1$; and d) setting $k_1=k_1/2$.

* * * * *